D. J. DAVIS.
LINE CASTING DEVICE.
APPLICATION FILED JULY 16, 1920.
1,376,260.
Patented Apr. 26, 1921.
2 SHEETS—SHEET 2.
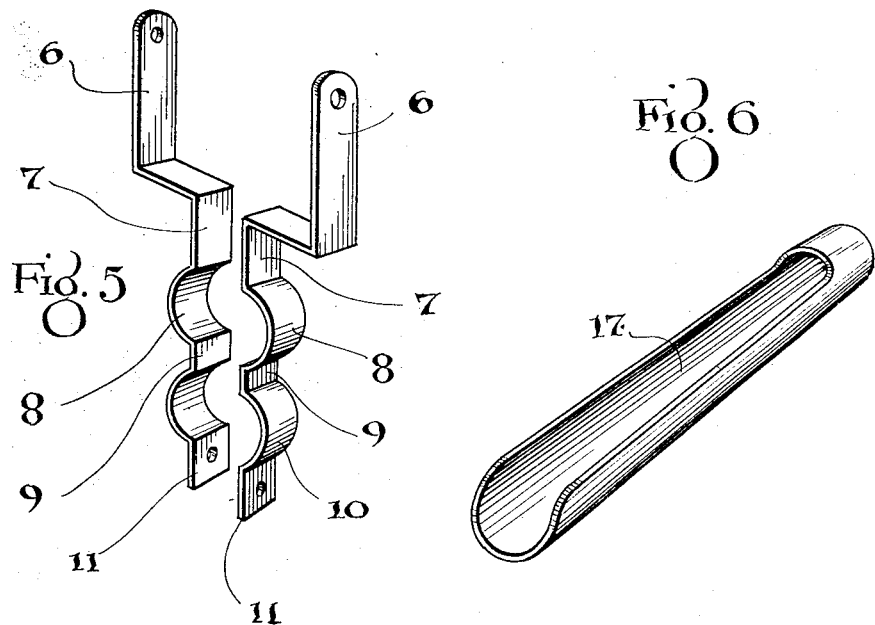
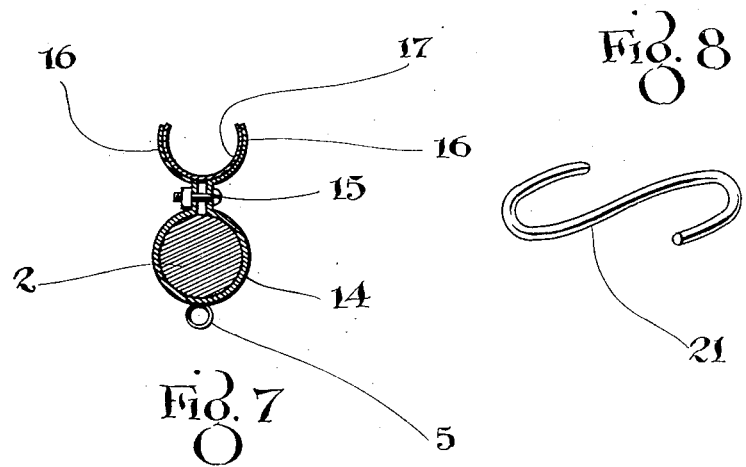
David J. Davis.
INVENTOR
BY Victor J. Evans
ATTORNEY
WITNESS:

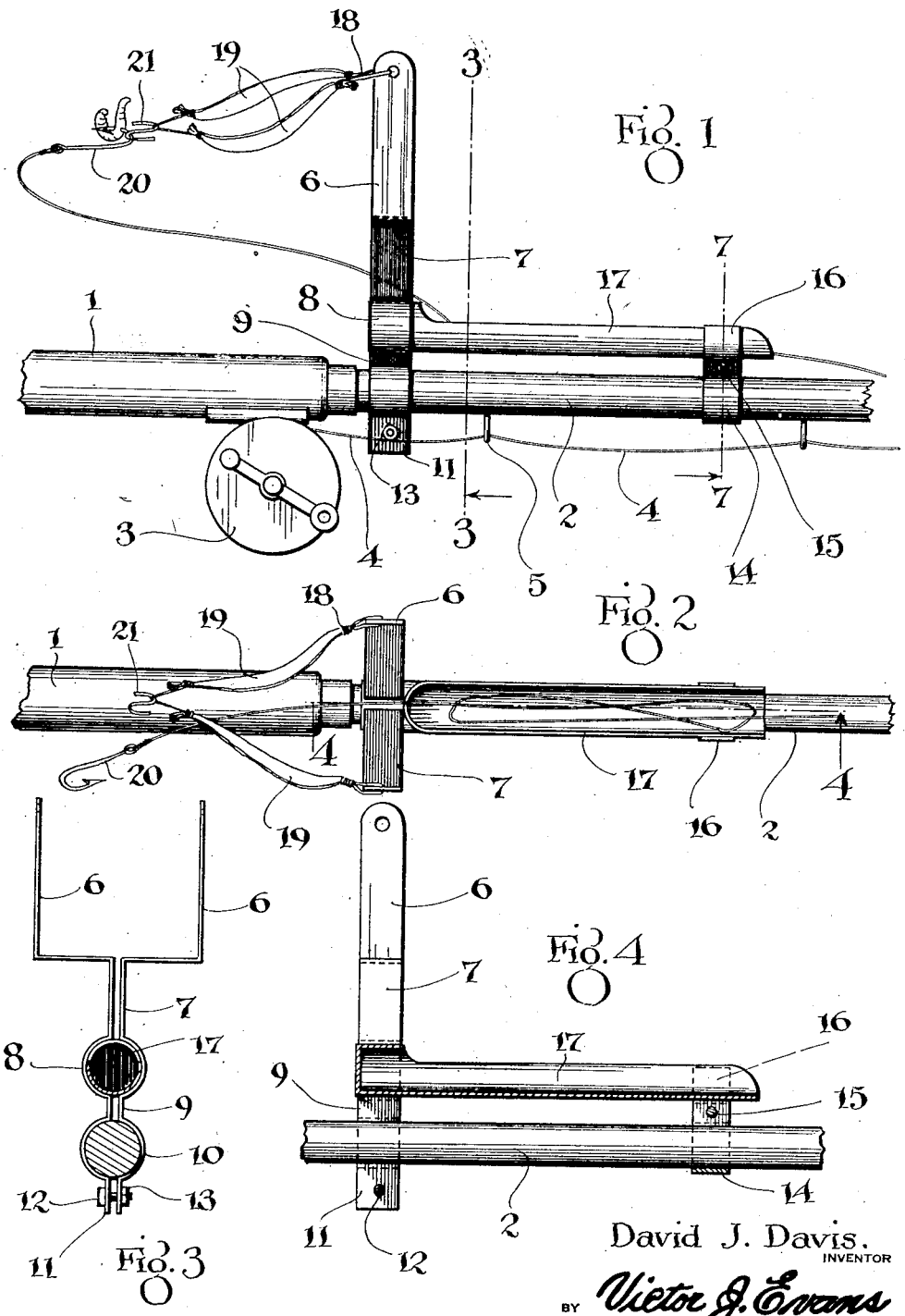

UNITED STATES PATENT OFFICE.

DAVID J. DAVIS, OF SEYMOUR, CONNECTICUT.

LINE-CASTING DEVICE.

1,376,260.

Specification of Letters Patent. Patented Apr. 26, 1921.

Application filed July 16, 1920. Serial No. 396,701.

*To all whom it may concern:*

Be it known that I, DAVID J. DAVIS, a citizen of the United States, residing at Seymour, in the county of New Haven, and State of Connecticut, have invented new and useful Improvements in Line-Casting Devices, of which the following is a specification.

My present invention has reference to a line casting device for fishing poles.

The primary object is the provision of means whereby a line may be cast in an easy and accurate manner for any desired or predetermined distance.

A further object is the provision of means which may be readily attached to any ordinary construction of fishing poles for facilitating and rendering accurate the casting of the line and which will not interfere with the reeling of the line or the casting of the line in the ordinary manner should such method of casting be desired.

It is a still further object of the invention to produce a casting attachment for fishing poles which may be easily and securely arranged thereon and as readily removed therefrom when desired.

The foregoing, and other objects which will appear as the nature of the invention is better understood, may be accomplished by a construction, combination and operative arrangement of parts, such as is disclosed by the drawings accompanying and forming part of this specification.

In the drawings:—

Figure 1 is a side elevation showing the improvement attached to a fishing pole.

Fig. 2 is a top plan view thereof.

Fig. 3 is a sectional view approximately on the line 3—3 of Fig. 1.

Fig. 4 is a sectional view approximately on the line 4—4 of Fig. 2.

Fig. 5 is a perspective view of the sling carrying member.

Fig. 6 is a perspective view of the line receiving pan.

Fig. 7 is a sectional view approximately on the line 7—7 of Fig. 1.

Fig. 8 is a detail view of one of the S hooks employed for connecting the fishing hook and the sling.

With my improvement only the inner or handle carrying section of a fishing pole may be employed, but, it will be obvious as the description progresses, that all of the joints may be connected to the pole, if desired.

On the handle 1 of the pole 2 there is connected, in the usual manner the reel 3. The line 4, which is trained around the reel passes through the usual guide members 5, on the pole.

As my improvement is designed to be folded into a small compact package whereby the same may be readily carried when not in use, I preferably construct the same of a plurality of elements.

In carrying out the invention, I make use of a yoke 6. In the showing of the drawings, the yoke is formed of two similarly constructed members, each being preferably in the nature of a flat plate. Each of the members, at the inner center thereof has a downwardly extending portion 7, and these portions when in abutting relation provide a standard. The standard has its arms rounded outwardly, as at 8—8, and the straight extensions formed at the ends of the said rounded portions, indicated by the numeral 9, are also bent and rounded outwardly, as at 10—10. These last mentioned portions provide a clip and have at their free ends extensions 11—11. The clip is designed to be arranged on the pole, as illustrated in the figures of the drawings, and the elements 11 compress the clip around the pole through the connecting means therefor. This means is preferably in the nature of a bolt 12 that passes through suitable openings in the elements 11, and that is engaged by a nut 13. If desired, suitable adjustable means may be provided for connecting the straight portions 9 of the standard.

On the rod, at a desired distance outward of the yoke and standard there is arranged a second U-shaped clip 14. The straight upper ends of the clip are connected by adjustable means 15, and from the said straight portions, the clip is formed with outwardly bulged or rounded portions 16. The elements 16 and 8 are designed to receive therein a preferably cross sectionally rounded pan 17. The frictional engagement between the elements 8—8 and 16—16 is sufficient to hold the pan in proper position on these elements, but, if desired, other means for accomplishing this purpose may be employed.

Connected to the upper ends of the arms of the yoke 6 is a sling 18. The side or parallel strands of the sling 18 are preferably pivoted and are connected by elastic strips 19. A sufficient length of the line 4 is drawn off of the reel 3, and lapped upon itself in the pan 17. On the hook 20 at the end of the line 4 I attach an S-hook 21. The second rounded member of the S-hook is received in the sling, and a pull on the sling, in a direction rearward of the yoke is exerted. When the operator releases the sling the line 4 and its hook 20 will be projected so that the line is cast the length thereof which had been received in the pan 17. The S-hook 21 may proceed in a straight direction away from the rod, but the hook will drop into the stream.

It is thought that the foregoing description, when taken in connection with the drawings, will fully set forth the construction and advantages of the improvement to those skilled in the art to which such inventions relate without further detailed description.

Having thus described the invention, what I claim, is:—

1. In a casting attachment for the lines of fishing poles, a pan supported on the pole and designed to receive the folded portion of a fishing line therein, a yoke at the rear of the pan, a spring sling connected to the yoke, and an S-hook designed to engage with the fish hook, and to be received on the sling, as and for the purpose set forth.

2. In a casting device for the lines of fishing poles, clips removably secured on the pole, a pan removably supported on the clips, and said pan designed to receive therein the folded portion of the fishing line, a standard arising from the inner clip, a yoke on said standard, an elastic spring sling connected to the arms of the yoke, and said sling designed to be engaged by the S-hook which is engaged by the fishing hook of the line for projecting the line, in a manner as herein set forth.

In testimony whereof I affix my signature.

DAVID J. DAVIS.